(12) United States Patent
Gaiduk et al.

(10) Patent No.: US 10,567,719 B2
(45) Date of Patent: Feb. 18, 2020

(54) METHOD FOR CORRECTING A COLOR REPRODUCTION OF A DIGITAL MICROSCOPE AND DIGITAL MICROSCOPE

(71) Applicant: CARL ZEISS MICROSCOPY GMBH, Jena (DE)

(72) Inventors: Alexander Gaiduk, Jena (DE); Burkhard Goetz, Jena (DE); Stanislav Kalinin, Weimar (DE); Michael Wacke, Goettingen (DE); Markus Jaeger, Markranstaedt (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 160 days.

(21) Appl. No.: 15/507,126

(22) PCT Filed: Aug. 25, 2015

(86) PCT No.: PCT/EP2015/069435
§ 371 (c)(1),
(2) Date: Feb. 27, 2017

(87) PCT Pub. No.: WO2016/030366
PCT Pub. Date: Mar. 3, 2016

(65) Prior Publication Data
US 2017/0264876 A1 Sep. 14, 2017

(30) Foreign Application Priority Data
Aug. 27, 2014 (DE) .................. 10 2014 112 285

(51) Int. Cl.
*H04N 9/64* (2006.01)
*G02B 21/06* (2006.01)
(Continued)

(52) U.S. Cl.
CPC .............. *H04N 9/646* (2013.01); *G01J 3/524* (2013.01); *G02B 21/06* (2013.01); *G02B 21/365* (2013.01)

(58) Field of Classification Search
CPC ........ G01J 3/524; G02B 21/06; G02B 21/365; H04N 9/646
(Continued)

(56) References Cited

U.S. PATENT DOCUMENTS

| 8,238,534 B2 | 8/2012 | Link et al. |
| 2007/0014000 A1 | 1/2007 | Nolte et al. |

(Continued)

FOREIGN PATENT DOCUMENTS

| DE | 10 2005 031 104 A1 | 1/2007 |
| EP | 2 204 980 B1 | 7/2010 |

(Continued)

OTHER PUBLICATIONS

International Search Report dated Nov. 30, 2015 issued in connection with International Application No. PCT/EP2015/069435 (6 pages total).

*Primary Examiner* — Christopher S Kelley
*Assistant Examiner* — Kathleen M Walsh
(74) *Attorney, Agent, or Firm* — Mayer & Williams PC; Stuart H. Mayer (57) ABSTRACT

A method for correcting colors of a color reproduction of a digital microscope and a digital microscope are described. In a first step of a method according to the invention, a color image of a sample that is to be examined under the microscope is recorded. When the recording is performed, wavelength-dependent properties of a microscope illumination unit that illuminates the sample are determined in order to describe a state of the microscope illumination unit, in that settings selected at the microscope illumination unit are captured. A set of correction values is determined, which is associated with a state of the microscope illumination unit that is selected in accordance with the state of the microscope illumination unit determined when the recording is (Continued)

performed. In a further step, the colors of the recorded color image of the sample are corrected by applying the correction values of the previously determined set.

8 Claims, 4 Drawing Sheets

(51) Int. Cl.
 *G01J 3/52* (2006.01)
 *G02B 21/36* (2006.01)
(58) Field of Classification Search
 USPC .......................................................... 348/80
 See application file for complete search history.

(56) References Cited

U.S. PATENT DOCUMENTS

| 2008/0018735 | A1 | | 1/2008 | Aizaki et al. | |
|---|---|---|---|---|---|
| 2009/0141127 | A1 | | 6/2009 | Aizaki | |
| 2011/0249155 | A1 | | 10/2011 | Hiraide | |
| 2012/0050727 | A1 | | 3/2012 | Yamamoto | |
| 2013/0044200 | A1 | * | 2/2013 | Brill | G02B 21/365 348/79 |
| 2014/0055592 | A1 | * | 2/2014 | Wei | G02B 21/34 348/E7.085 |
| 2014/0078285 | A1 | * | 3/2014 | Mitsui | H04N 9/045 348/79 |
| 2015/0103401 | A1 | * | 4/2015 | Park | G02B 21/34 359/363 |
| 2015/0124072 | A1 | * | 5/2015 | Wei | H04N 9/735 348/79 |

FOREIGN PATENT DOCUMENTS

| JP | 4217494 B2 | 2/2009 |
|---|---|---|
| JP | 4311945 B2 | 8/2009 |
| WO | 2010/002070 A1 | 1/2010 |

\* cited by examiner

METHOD FOR CORRECTING A COLOR REPRODUCTION OF A DIGITAL MICROSCOPE AND DIGITAL MICROSCOPE

FIELD

The present invention relates first to a method for correcting colors of a color reproduction of a digital microscope. The method allows for a true-color reproduction of a sample that is to be examined under the microscope. It therefore relates to a method for color management of the digital microscope. The invention further relates to a digital microscope with an image processing unit designed to allow for color correction.

BACKGROUND

US 2013/0044200 A1 presents a system for color correction in microscope slides. The slide which is carrying a sample also features a plurality of color references. The color references are illuminated jointly with the sample and recorded by the microscope. Based on the recorded color references, a color correction of the recorded image is made.

U.S. Pat. No. 8,238,534 B2 presents a device for microscopy, comprising a unit for capturing an optical element exposed to microscope illumination unit. Depending on the respective captured optical element, parameters for color correction are read from a memory in order to be used for performing a color correction of the images recorded with an image recording unit of the microscope.

From US 2014/0055592 A1, a system for color correction in slides for transmitted light microscopy is known, in which a color filter field is arranged on the slides. The color filter field is illuminated by the microscope illumination unit and recorded in order to perform a color correction of the recorded images.

JP 4311945 B2 presents an electronic camera for microscopy in which a correction of the color tone and color saturation of a recorded video signal is performed by way of a multiplication with predefined coefficients.

From JP 4217494 B2, an electronic camera for a microscope is known, in which a suitable color gradation is selected from a plurality of possible color gradations with the help of a processor.

The EP 2 204 980 B1 presents an image processing unit for a microscope in which first and second image data are captured by means of an image recording device. From these, first interpolated RGB image data and second interpolated RGB image data are generated by means of an RGB interpolation unit. The first interpolated RGB image data are color-corrected in order to calculate a color matrix and a gradation parameter, which are then used for the color correction of the second interpolated RGB image data.

US 2012/0050727 A1 presents an imaging system, which may, for instance be designed as a microscope, and which comprises a correction unit for correcting images of the sample that is to be imaged. This correction is based on spectral information that was captured with a spectral sensor.

US 2011/0249155 A1 presents an image recording system, specifically one designed as a microscope and comprising a color tone correction unit for correcting images the of the sample that is to be imaged that were recorded with a line sensor. This correction is based on spectral information that was captured with a spectral sensor.

US 2008/0018735 A1 presents a microscopic recording device in which a color correction matrix is used that is calculated from a camera characteristic. The camera characteristic is stored in a memory and contains data about the spectral sensitivity of the image converter which are determined based on the background of the recorded image.

From DE 10 2005 031 104 A1, a method for true-color image reproduction of an automatic microscope is known. In this method, the parameters for controlling a light source are captured in order to associate it with a measured spectral distribution of the light source upon initial operation and in order to use these association data during subsequent regular operations for a regulated control of the light source. Furthermore, a compensation of established spectral deviations must be made by way of an adjustment of the spectral distribution of the monitor image to the spectral distribution of the light source.

Based on existing prior art, the task of the present invention is to improve the correction of colors in a color reproduction of a digital microscope in order to make possible a true-color reproduction of a sample that is to be examined under the microscope.

SUMMARY

The aforementioned task is accomplished by way of a method according to the enclosed claim 1 and by way of a digital microscope according to the enclosed ancillary claim 10.

The method according to the invention serves for correcting the colors of a color reproduction of a digital microscope. In a digital microscope, an electronic image conversion takes place, in which the recorded image is further processed in the form of digital data and displayed on an electronic image reproduction device.

In a first step of the method according to the invention, a color image of a sample that is to be examined under the microscope is recorded by means of the digital microscope. This color image is the subject of the color correction. When the recording is performed, wavelength-dependent properties of a microscope illumination unit that illuminates the sample are determined in order to describe a state of the microscope illumination unit, in that settings selected at the microscope illumination unit are captured. This step of the method takes into account that microscope illumination units can be modified for adjustment to the targeted recording. For instance, the illumination level can be varied, or a specific type of lighting can be selected, such as bright field and dark field illumination, or different individual light sources can be selected and aimed. The selected microscope illumination unit settings therefore include parameter settings and/or a selection of configurations. The settings and/or the wavelength-dependent properties of the microscope illumination unit are preferentially stored in one or multiple memories, so that capturing the settings includes a reading of the memory. Moreover, the settings can be captured indirectly as a result of a spectral measurement of the illumination light emitted by the microscope illumination unit; for instance, with a miniature spectrometer or with a miniature multi-wavelength image sensor. The settings in their entirety lead to a state of the microscope illumination unit which is recorded according to the invention through the capturing of the settings. The different states of the microscope illumination unit are characterized in that they lead to different wavelength-dependent properties of the microscope illumination unit. Specifically, the radiation intensity of the electromagnetic radiation of the microscope illumination unit on the sample is wavelength-dependent.

In a further step of the method according to the invention, a set of correction values is determined. The set of correction values may consist, for instance, of a field, preferentially by one or multiple vectors, or by one or multiple correction value matrices. The correction values represent correction factors. The set of correction values that is to be determined is associated with a state of the microscope illumination unit which is selected based on the state of the microscope illumination unit determined when the recording is performed, in other words, the set of correction values that is to be determined is selected based on the state of the microscope illumination unit determined when the recording is performed, for which the associated state serves as a criterion. The set of correction values that is to be determined is suitable to perform a color correction of such recorded images that were recorded in the associated state of the microscope illumination unit. The previously recorded color image of the sample can be color-corrected by way of the set of correction values that is to be determined.

In a further step of the method according to the invention, the colors of the recorded color image of the sample are corrected through the application of the correction values of the previously determined set. The result is a color-corrected image of the recorded sample. The color correction preferentially also comprises a white balance adjustment.

A special advantage of the method according to the invention is that for the color correction of the image recorded with the digital microscope, the wavelength-dependent spectral properties of the microscope illumination unit are taken into account in their respective current state.

In preferred embodiments of the method according to the invention, wavelength-dependent properties of an optical recording device of the microscope are taken into account as well. The optical recording device comprises an optical system and an electronic image converter. The optical system may comprise, for instance, a lens, an aperture, and zoom optics. The image converter may also be described as a sensor or as an image sensor. In these preferred embodiments, when recording the color image of the sample that is to be examined under the microscope, further wavelength-dependent properties of the optical recording device for describing a state of the optical recording device are determined by capturing the selected settings on the optical recording device. Different states of the optical recording device, in which the optical recording device features different wavelength-dependent properties, are generated by way of different settings, for instance by way of different parameter settings or by way of different configurations of the optical system. These settings selected on the optical recording device are captured together with the settings selected on the microscope illumination unit. The settings and/or the wavelength-dependent properties of the optical recording device are preferentially stored in one or multiple memories, so that capturing the settings includes a reading of the memory. Furthermore, in these preferred embodiments, the set of correction values that is to be determined is associated with a state of the optical recording device. Accordingly, the set of correction values that is to be determined is associated with a state of the microscope illumination unit and to a state of the optical recording device. The state of the optical recording device associated with the set of correction values that is to be determined is selected based on the state of the optical recording device determined when the recording is performed. The set of correction values that is to be determined is suitable to perform a color correction of such recorded images that were recorded in the associated state of the microscope illumination unit and in the associated state of the optical recording device. The set of correction values that is to be determined is suitable for being used to correct the previously recorded color image of the sample. An advantage of these preferred embodiments is that the wavelength-dependent properties of all components of the digital microscope influencing the color reproduction are taken into account. In what follows, preferred embodiments are described in which the wavelength-dependent properties of the optical recording device are preferentially, but non-mandatorily to be taken into account.

Determining a set of correction values preferentially includes a partial step in which at least one set of correction values is selected from a plurality of stored and different states of the microscope illumination unit and, if applicable, different states of the set of correction values associated with the optical recording device. The state of the microscope illumination unit that is associated with the selected set of correction values most closely approximates the state of the microscope illumination unit determined when the recording is performed. To the extent that the wavelength-dependent properties of the optical recording device are taken into account, the state of the optical recording device that is associated with the selected set of correction values most closely approximates the state of the optical recording device determined when the recording is performed as well. Therefore, in order to find matching states, the determined states of the microscope illumination unit and, if applicable, of the optical recording device are compared with the states of the microscope illumination unit and, if applicable, of the optical recording device associated with the stored sets, so that at least one set of correction values is selected that is suitable for correcting the colors of the recorded image.

In a first group of preferred embodiments, the selected set of correction values is directly used as the set of correction values that is to be determined, so that the correction values of the selected set are used directly for correcting the colors of the recorded image. This first group of preferred embodiments is specifically suitable when the state of the microscope illumination unit associated with the selected set of correction values is identical to the state of the microscope illumination unit determined when the recording is performed, and, if the wavelength-dependent properties of the optical recording device are taken into account, when the state of the optical recording device associated with the selected set of correction values is identical to the state of the optical recording device determined when the recording is performed.

Furthermore, in a second group of preferred embodiments, the determining of a set of correction values comprises a partial step in which the correction values of the selected set are adapted in order to obtain from them the set of correction values that is to be determined. This adjustment is preferentially done by way of extrapolation. This second group of preferred embodiments is specifically suitable when the state of the microscope illumination unit associated with the selected set of correction values is only similar to the state of the microscope illumination unit determined when the recording is performed, and/or, if the wavelength-dependent properties of the optical recording device are taken into account, when the state of the optical recording device associated with the selected set of correction values is only similar to the state of the optical recording device determined when the recording is performed.

In a third group of preferred embodiments, at least two of the sets of correction values are selected from the plurality of sets of correction values associated with stored and different states of the microscope illumination unit and, if applicable, of different states of the optical recording device, in order to obtain from them indirectly the set of correction values that is to be determined. For these purposes, determining a set of correction values further includes a partial step in which the correction values of the two selected sets are interpolated, and in which the result of the interpolation represents the set of correction values that is to be determined. This third group of preferred embodiments is specifically suitable when the state of the microscope illumination unit determined when the recording is performed is quantitatively between those of the two selected sets of correction values, or when the captured state of the optical recording device is quantitatively between those of the two selected sets of correction values. The two selected sets of correction values may, for instance, be associated with such states of the microscope illumination unit or of the optical recording device which correspond to the extremes of the settings selected on the microscope illumination unit or on the optical recording device.

The method according to the invention is preferentially performed through the application of color families. Each of the color families includes a selection of colors that can be represented by way of the color reproduction. In these embodiments, in order to determine a set of correction values, at first, color values appearing in the recorded image are determined, which are then associated with one of several predefined color families. Each of the sets of correction values associated with stored and different states of the microscope illumination unit and, if applicable, with different states of the recording device, is associated with one of the predefined color families. The selected set of correction values is associated with the same color family with which the recorded image is associated as well. The selected set of correction values specifically includes only such correction values that are suitable for correcting the colors of this color family. These embodiments have the advantage that correction values only have to be available for a limited selection of all possible colors, so that a smaller quantity of data can be processed.

In further preferred embodiments, it is assumed that the color families associated with the correction values sets are not complete. In these embodiments, in order to determine a set of correction values, at first, color values appearing in the recorded image are determined again, which are then associated with one of several predefined color families. Each of the color families includes a selection of colors that can be represented by way of the color reproduction. Each of the sets of correction values associated with stored and different states of the microscope illumination unit and, if applicable, with different states of the optical recording device, is associated with one of the color families, the selected set of correction values being associated with the color family which most closely approximates the color family associated with the recorded image.

The sets of correction values associated with stored and different states of the microscope illumination unit and, if applicable, with different states of the optical recording device, are preferentially determined in advance, in other words, before the image of the sample that is to be examined under the microscope is recorded. This identification of the sets of correction values is preferentially accomplished in a calibration procedure, which takes place before the examination of samples under the microscope.

The identification of the sets of correction values, in other words, the calibration procedure, preferentially comprises multiple partial steps. In one partial step, the wavelength-dependent properties of the microscope illumination unit in the multiple states of the microscope illumination unit are captured by associating the selected settings on the microscope illumination unit. To the extent that the wavelength-dependent properties of the optical recording device are taken into account, a further partial step follows, in which the wavelength-dependent properties of the optical recording device in the multiple states of the optical recording device are captured by associating the selected settings on the optical recording device. In a further partial step, at least one color image of a color reference is recorded with the digital microscope in each of the multiple states of the microscope illumination unit and, if applicable, in each of the multiple states of the optical recording device. The color reference is a device for standardized color reproduction, for instance a color field arranged on a color reference card. It is also possible for multiple color references to be recorded simultaneously. In a further partial step, a respective set of correction values is determined for each of the multiple states of the microscope illumination unit and, if applicable, for each of the multiple states of the optical recording device, which describes the correction of the image recorded in the respective state of the microscope illumination unit and, if applicable, in the respective state of the optical recording device for true-color reproduction of the color reference. This determines the correction values, taking into account the wavelength-dependent properties of the microscope illumination unit and, if applicable, of the optical recording device. Each of the sets of the correction values is associated with one of the states of the microscope illumination unit and, if applicable, with one of the states of the optical recording device.

In the calibration procedure, the images, in other words, the colors of the images, are preferentially processed in RGB format.

In an alternative preferred embodiment, no such calibration procedure in which the plurality of correction value sets is determined in advance is performed. Instead, a set of correction values is determined while the sample is examined under the microscope. This identification of the set of correction values is done by means of a calculation, taking into account the wavelength-dependent properties of the microscope illumination unit that illuminates the sample, and, if applicable, also taking into account the wavelength-dependent properties of the optical recording device recording the sample. Therefore, a simulation is performed of the wavelength-dependent illumination and, if applicable, of the wavelength-dependent optical processing. In other words, the set of correction values is obtained by way of a simulation. The correction values describe the correction of the image recorded subject to the influence of the wavelength-dependent properties of the microscope illumination unit illuminating the sample and, if applicable, of the wavelength-dependent properties of the optical recording device recording the sample, for true-color reproduction of the colors of the sample.

When determining the set of correction values by way of simulation during the examination of the sample under the microscope, the colors are preferentially described by way of their respective spectrum.

Rather than during the examination under the microscope, the identification of the set of correction values while taking into account the wavelength-dependent properties of the microscope illumination unit illuminating the sample and, if applicable, taking into account the wavelength-dependent properties of the optical recording device recording the sample, may also be performed at a time different from the time of the examination under the microscope, for which purposes the at least one set of correction values must be stored in a memory in advance. For these purposes, preferentially, several of the sets of correction values are calculated and stored in advance.

The wavelength-dependent properties of the microscope illumination unit are preferentially described by way of a spectrum of the microscope illumination unit. Correspondingly, the wavelength-dependent properties of the optical recording device may be described by at least one spectrum of the optical recording device as well.

Each of the aforementioned spectra is preferentially described by way of a plurality of grid points of the spectral profile, for instance by way of 200 grid points.

In the different states of the microscope illumination unit, this [plurality] features different wavelength-dependent properties, specifically different intensities in individual spectral ranges. Moreover, the microscope illumination unit in its multiple states specifically also features different illumination level values. Furthermore, the microscope illumination unit in its multiple states preferentially also features different beam directions of the light cast on the sample.

The optical recording device in its multiple states preferentially features different focal lengths. Moreover, the optical recording device in its multiple states preferentially features different lens configurations, for instance in the form of different interchangeable lenses. Furthermore, the optical recording device in its multiple states preferentially features different image converter configurations, for instance in the form of different interchangeable image converters. The settings selected on the microscope illumination unit are preferentially captured by spectrally measuring the illumination light emitted from the microscope illumination unit. For these purposes, at least one wavelength-sensitive sensor is used, which preferentially consists of a miniature spectrometer or of a miniature multi-wavelength image sensor. The wavelength-sensitive sensor or the multiple wavelength-sensitive sensors are preferentially integrated into the digital microscope; for instance into the microscope illumination unit, into the lens, or into an optical module. Furthermore, the wavelength-sensitive sensor or one or several of the multiple wavelength-sensitive sensors is preferentially arranged on a sample carrier or on a microscope stand, in particular in order to be able to measure the microscope illumination in terms of incoming external light, such as lamps or daylight. By means of the at least one wavelength-sensitive sensor, the spectral data of the illumination light can be determined upon request or during an initialization or calibration procedure or at predefined moments in order to store them temporarily; for instance on a PC or in an EPROM or in a memory of the digital microscope or in an EPROM or a memory of a lens. To the extent that one or multiple wavelength-sensitive sensors are arranged on the sample carrier or on the microscope stand, this, together with other options for arranging the multiple wavelength-sensitive sensors, makes it possible to determine the correction values, even when microscope illumination unit comes in the form of daylight, for instance, or of other light sources illuminating the sample. To that extent, the settings selected on the microscope illumination unit also include orientations of the microscope with respect to daylight or to any other light sources illuminating the sample. The at least one wavelength-sensitive sensor is preferentially calibrated in advance, for instance by means of a calibrated external light source.

The wavelength-dependent properties of the microscope illumination unit are preferentially stored in and retrievable from a memory arranged on the digital microscope. The wavelength-dependent properties of the lens are preferentially stored in a memory arranged on the lens, especially if the lens is an interchangeable lens. The wavelength-dependent properties of the image converter are preferentially stored in a memory arranged on the digital microscope.

The settings selected on the microscope illumination unit preferentially consist of a setting of the illumination level, a selection of individual light sources, an orientation of the microscope illumination unit or of the individual light sources, a setting of an illumination aperture, and/or a selection of the type of illumination, such as dark or bright field illumination. Alternatively, the settings selected on the microscope illumination unit may preferentially be captured by way of a reading of the setting elements on the microscope illumination unit, in other words, by having these setting elements also serve for the purpose of capturing the settings selected on the microscope illumination unit. These embodiments have the advantage that the microscope illumination unit does not have to be measured when the recording of the sample that is to be examined under the microscope is performed.

The settings selected on the optical recording device preferentially consist of a selection of an interchangeable lens, a selection of an interchangeable image converter, a setting of a recording aperture, and/or a setting of a focal length.

The digital microscope according to the invention comprises at least one optical recording device, a microscope illumination unit, and an image processing unit, which is configured for the execution of the method according to the invention. The image processing unit is preferentially configured for the execution of preferred embodiments of the method according to the invention. Furthermore, the digital microscope according to the invention also features such characteristics as those described in the context of the method according to the invention and its preferred embodiments. Specifically, the digital microscope preferentially comprises a wavelength-sensitive sensor for the spectral measurement of the illumination light emitted by the microscope illumination unit.

BRIEF DESCRIPTION OF THE DRAWINGS

Additional advantages, details, and further developments of the invention follow from the subsequent description of preferred embodiments of the invention, in reference to the drawing. The figures show as follows.

DETAILED DESCRIPTION

Figure 1:
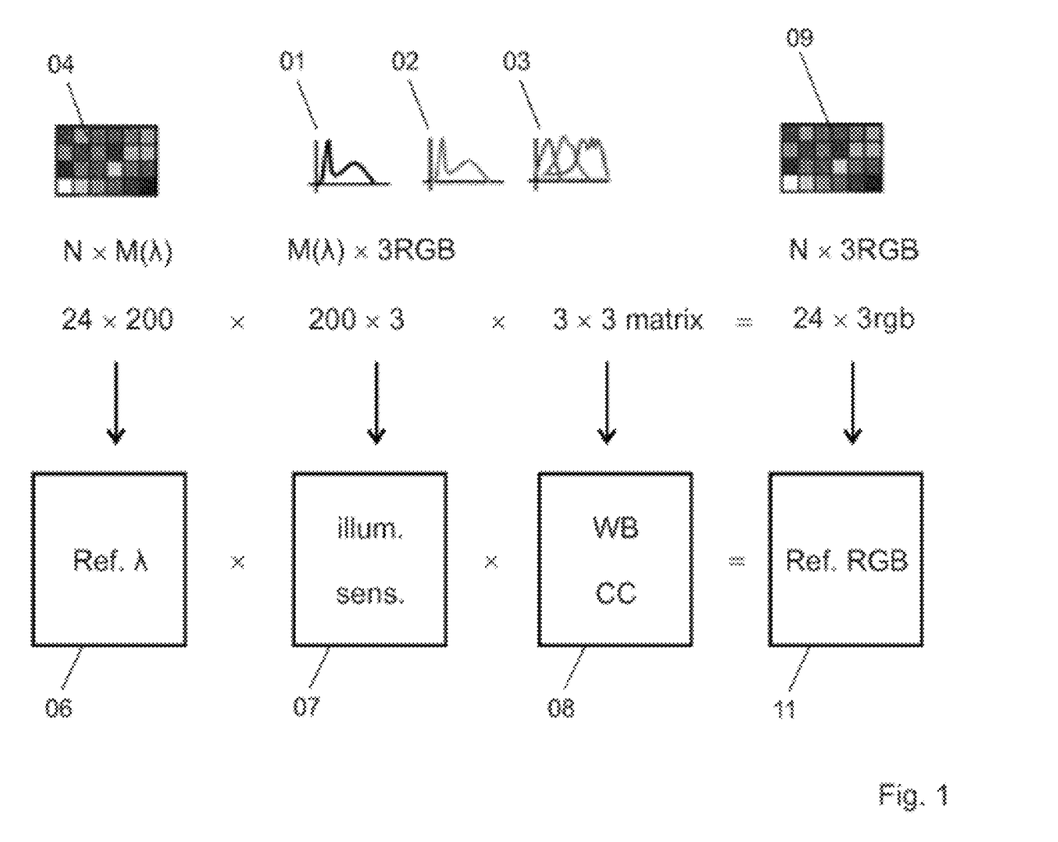
FIG. 1 is a representation of the principle of determining correction values according to a first preferred embodiment of the method according to the invention.

FIG. 1 shows a representation of the principle of determining correction values according to a first preferred embodiment of the method according to the invention.

In a digital microscope, various settings and configurations can be adjusted. For instance, a dark field illumination or a bright field illumination may be selected, which is symbolized by a spectrum 01 of a dark field illumination and by way of a spectrum 02 of a bright field illumination, respectively. Furthermore, the spectral range can be adjusted, for instance in the visible wavelength range or in the near IR range, which may be caused, among other things, by a variation of the light source, such as a white light LED or a xenon lamp. Moreover, the spectral properties of transmission and/or reflection may be changed by the optical elements or by the optical system of the digital microscope. Furthermore, the spectral sensitivity of the image converter, in other words, of the sensor can be adjusted. The spectral properties of the optical system and of the image sensor are symbolized by spectra 03.

Each of the spectra 01, 02, 03 is described in the shown example by way of 200 respective grid points.

The method according to the invention uses a color reference 04 which may be physically available in the form of a color reference table, for instance and which is recorded with the digital microscope (cf. FIG. 2), or which is simulated as in the embodiment shown. For instance, N=24 reference colors may be used. In the case of the exemplary simulation shown, these N=24 colors are respectively shown as a spectrum with, for instance, M=200 grid points. Alternatively, also a reduced number may be selected, instance N=3 with M=3; for instance three values for RGB. The reference colors are symbolized by a first field 06.

The spectral properties 01, 02, 03 of the lighting, the optical system, and of the image sensor are symbolized by a second field 07. These spectral properties 01, 02, 03 determine how the uncorrected colors of the color reference 04 are shown, and therefore how they are falsified. It requires a color correction CC, which involves a white balance adjustment WB, in order to correct the falsified colors, which is symbolized by a third field 08. The result is the corrected colors 09 of the color reference, which is symbolized by a fourth field 11.

According to the invention, the correction values symbolized by the third parties field 08 are determined in order to then use them for the color correction of recorded images of samples.

Since the spectral properties 01, 02, 03 symbolized by the second field 07 of the lighting, the optical system, and of the sensor are known, in the embodiment shown, the correction values symbolized by the third field 08 can be determined mathematically in their entirety, which corresponds to a simulation of the digital microscope.

The identification of the correction values symbolized by the third field 08 may also be subdivided into two or multiple steps, if an interim step with interim reference data is needed. Such interim reference data may be defined by additional requirements in order to be able to fall back on different color spaces, such as CIE 1931 XYZ, for instance.

The fully mathematical identification of the correction values symbolized by the third field 08, taking into account the spectral properties 01, 02, 03 the lighting, the optical system and of the sensor, can be performed as a live solution, since while the examination under the microscope is performed, every adjustment of a spectral property, for instance by way of changes to the illumination level, leads to an entirely new calculation of the correction values. However, this embodiment may also be performed at a separate time, prior to the examination under the microscope, for which purposes the determined correction values must be stored in memory correspondingly. The calculation of the correction values may be performed by software, which may be operating, for instance, on a PC, on a tablet computer, or on a smartphone. The calculation of the correction values may also be performed by hardware, for instance by way of specific algorithms in a field programmable gate array (FPGA) or in a media processor.

Figure 2:
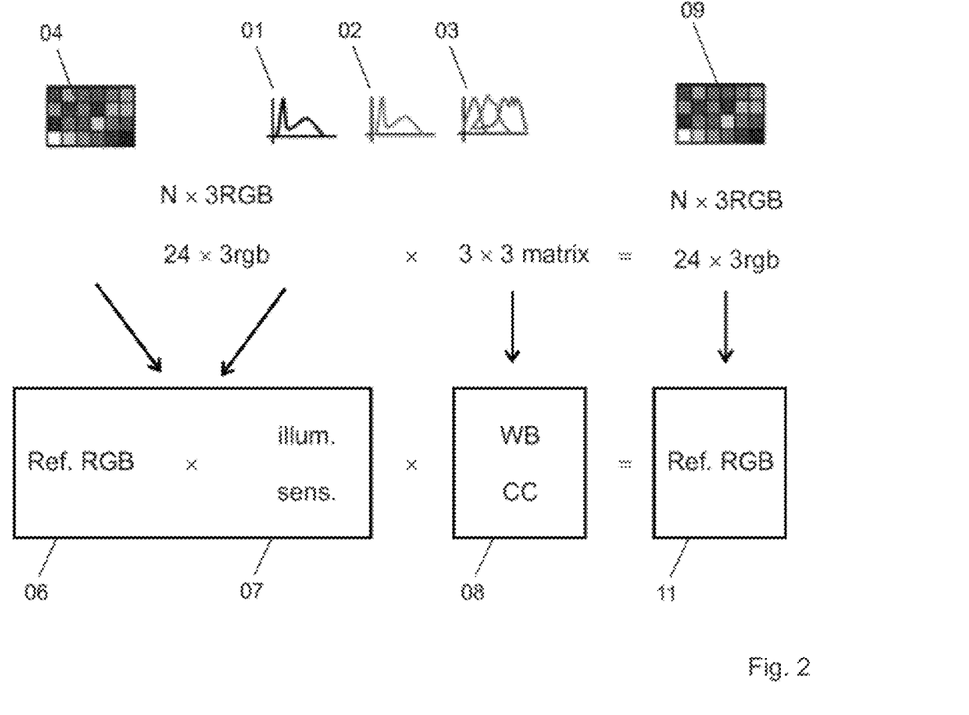
FIG. 2 is a representation of the principle of determining correction values according to a second preferred embodiment of the method according to the invention.

FIG. 2 shows a representation of the principle of determining correction values according to a second preferred embodiment of the method according to the invention.

In this embodiment, the color reference 04 is physically used in the form of a color reference table, which is recorded with the digital microscope. Here too, N=24 reference colors are used, for example, so that N=24 RGB color values of the 24 recorded reference colors of the color reference table 04 are available. The recorded reference colors are the reference colors symbolized by the first field 06, which were impacted by the spectral properties 01, 02, 03 the lighting, the optical system and of the sensor, symbolized by the second field 07, which is symbolized by a joint field 06, 07.

The embodiment shown represents a calibration procedure in which the color reference table 04 is recorded with the digital microscope, and the settings of the digital microscope which determine the spectral properties 01, 02, 03 of the lighting, the optical system, and of the sensor provision are captured. As a result of varying settings, different spectral properties 01, 02, 03 are generated, in other words, different states of the digital microscope, with a set of correction values, in other words, a correction matrix, associated with each state. In addition, achromatic color references can be used for determining the correction values for the white balance adjustment.

The identification of the correction values can be done using the method of the least squares, in which an optimization for all reference colors is possible with identical weighting. Alternatively, the method of the least squares can be used while maintaining white color dots, in other words, an optimization is performed for all reference colors, in which the achromatic reference colors are weighted higher. Alternatively, other weightings can be performed.

Therefore, before the operation of the digital microscope, a plurality of sets of correction values is available, each of which is assigned to a respective state of the digital microscope. While the microscope is operated, it is possible to fall back to the previously determined sets of correction values; however, preferentially, a parameter-specific interpolation is performed, since the previously determined sets of correction values are only associated with a limited selection of possible states of the digital microscope. In a simple case, for instance, respective sets of illumination level correction values were determined in advance only for the two extremes: the minimum and the maximum illumination levels, respectively. In most cases, the illumination level setting on the digital microscope is between these two extremes, so that an interpolation must be performed between the correction values of the two previously determined sets.

The parameters representing the properties of the components of the digital microscope, such as the serial number, reference data, lighting, and spectrum, for instance, can be stored in different ways. A first possibility is the storage of these parameters on a PC, in a tablet computer or in a smartphone. Alternatively, these data can be stored at a central location. An additional preferred possibility is the storage of these parameters in the hardware of the respective components. The storage of the parameters representing the properties of the components of the digital microscope allows for specific color management algorithms for using the requisite parameters, if necessary. This makes it possible to guarantee a consistent color quality of the recorded images, independent of the respectively selected components. Different components such as different light sources for the microscope illumination unit or different interchangeable lenses, for instance, lead to entirely different properties, which is taken into account by a reading of the respective parameters and the use of these parameters. Different microscope illumination units can lead to entirely different spectra. For instance, spectra and color correction values of a dark field illumination source arranged in a lens can be stored in a memory element in the interchangeable lens. For instance, spectra and color correction values of a bright field illumination source can be stored together with spectral properties of the sensor in a memory element in the digital microscope.

Figure 3:
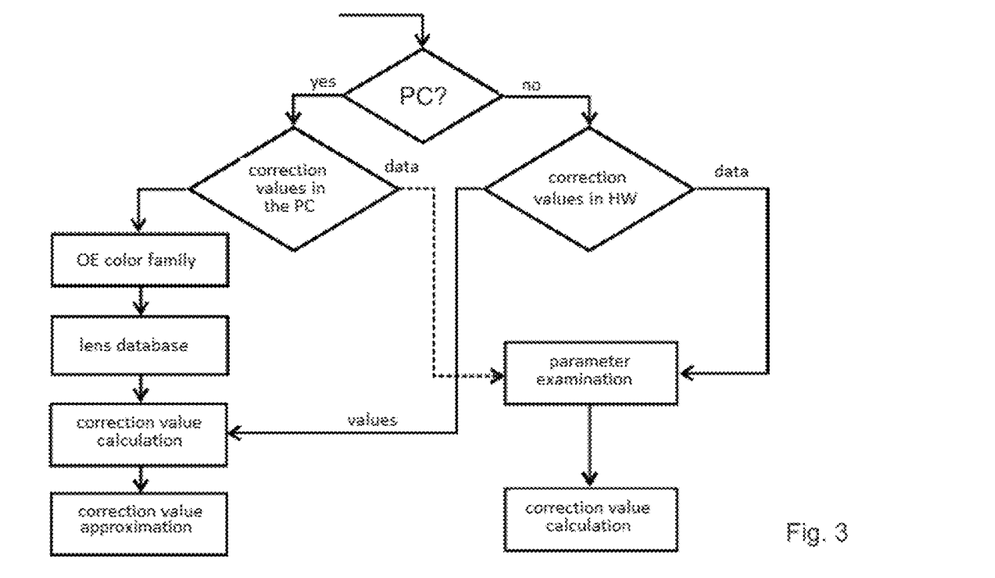
FIG. 3 is a flow chart of an identification of correction values according to the invention corresponding with a general embodiment.

FIG. 3 shows a flow chart of a correction value identification procedure according to a general embodiment of the method according to the invention. The calculations are performed on a PC, which constitutes an image processing unit of the digital microscope. To begin with, it is determined whether the required parameters or correction values are stored in the PC. If that is the case, the correction values for the color correction or the parameters, such as spectra, for instance, are read. They refer to a color family of the selected optical engine OE. The optical engine describes the optical recording by way of the digital microscope in its current state. Specifically, the optical engine describes the properties of the microscope illumination unit and of the image sensor. The color family is a selection of the possible colors. Furthermore, parameters of the selected lens are read from a lens database. The correction values for the color correction or the parameters are examined by way of a comparison with correction values and parameters stored in a memory arranged in the hardware components HW of the digital microscope. Then follows an approximation of the correction values, for instance by way of an interpolation of the read correction values. If the requisite parameters or correction values are not stored in the PC, they are calculated based on the parameters stored in the hardware components HW by way of a simulation.

Figure 4:
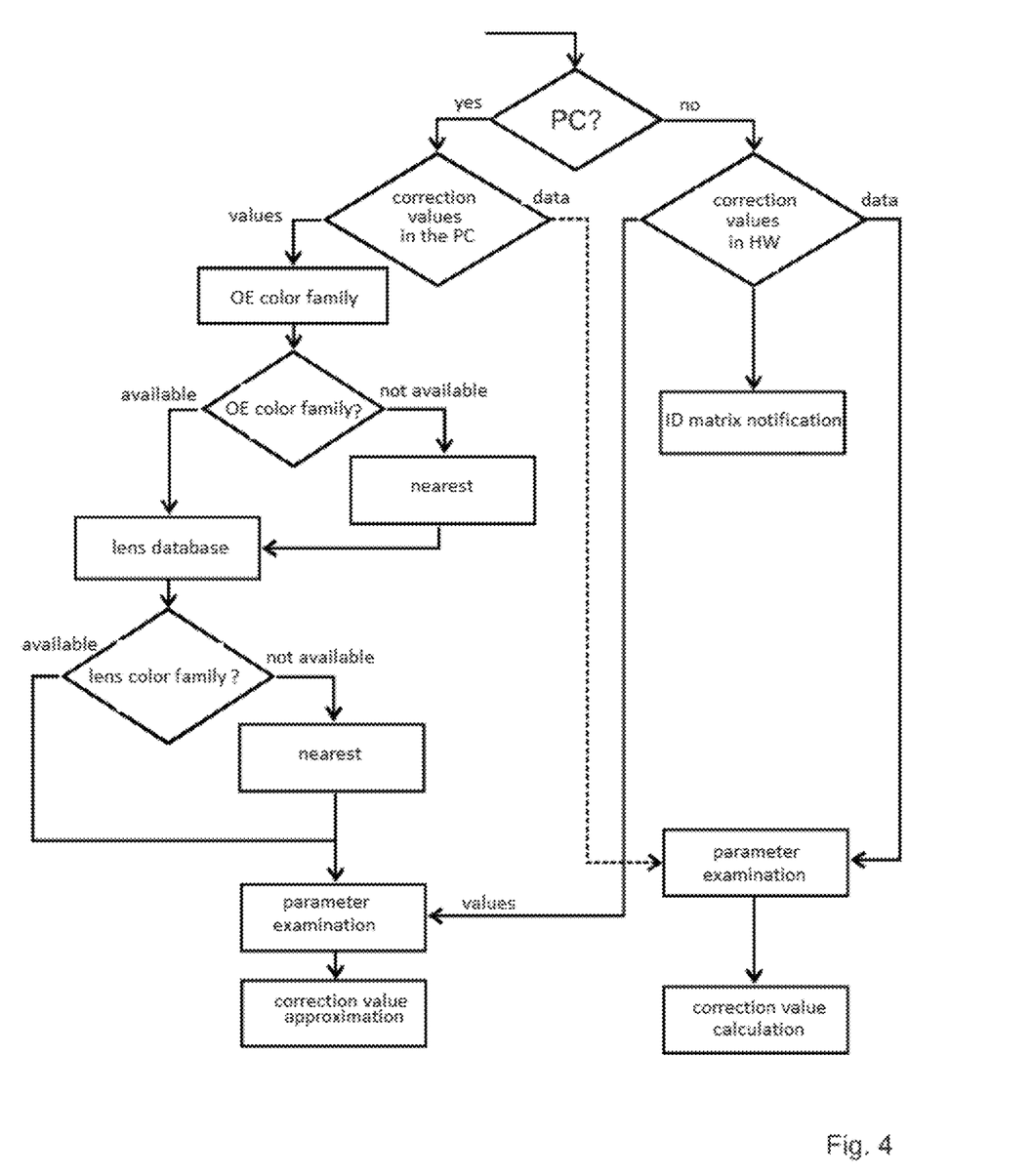
FIG. 4 is a flow chart of the identification of correction values according to the invention corresponding with a typical embodiment.

FIG. 4 shows a flow chart of the correction value identification procedure according to a typical embodiment of the method according to the invention. Initially, the operational sequence is identical to the operational sequence shown in FIG. 1. In this case, however, it is assumed that not all required parameters are available. Correspondingly, there are queries as to whether the respective color families of the optical engine and of the lens are available. If they are not available, the respectively closest color family is used as a fall-back.

Figure 5:
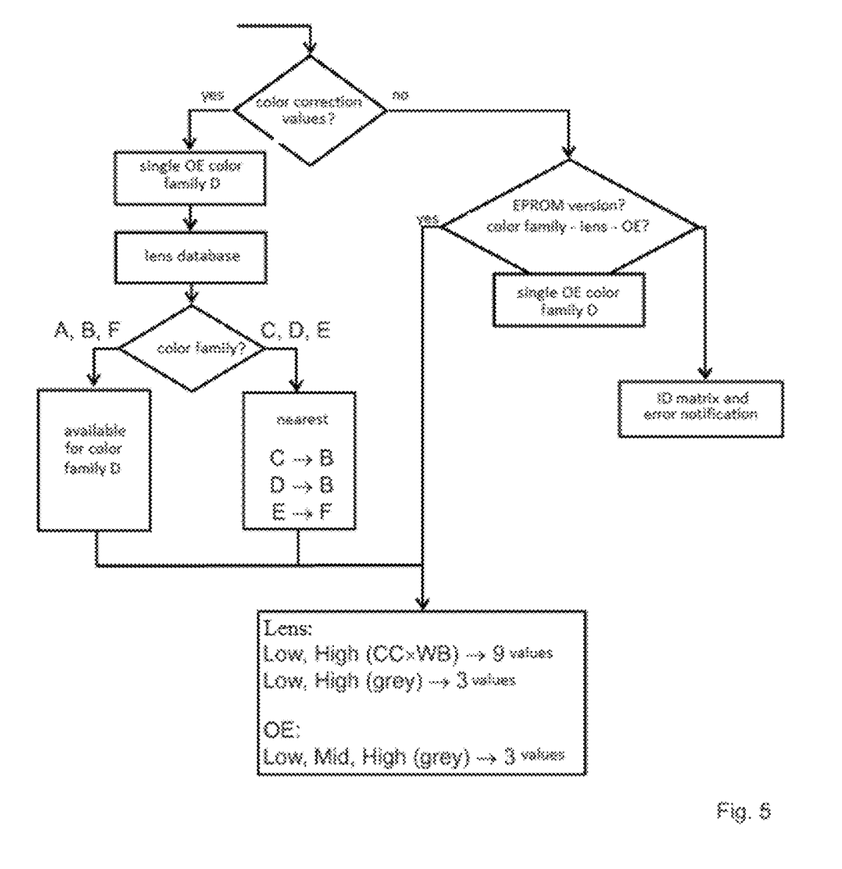
FIG. 5 is a flow chart of the identification of correction values according to the invention corresponding with a further typical embodiment.

FIG. 5 shows a flow chart of the correction value identification procedure according to a further typical embodiment of the method according to the invention. Contrary to the processes shown in FIG. 1 and FIG. 3, a single color family D is exemplarily identified for the optical engine, and three color families A, B, F for the lens. The single color family D for the optical engine is exemplarily associated with a specific bright field illumination and with a specific sensitivity of the image sensor. Information about the color families and about the color correction values is stored in a database on the PC. These data are further stored in an EPROM memory in the components of the digital microscope. The required values are initially searched for on the PC. If they are not stored there, the values of the nearest color families are searched for. If these are not stored either, the required data are searched for in the memory arranged in the components of the digital microscope. If they are not stored even there, a state-identifying matrix is used, and a notification about the absent color correction values is returned.

As already explained above, the necessary color correction values can be obtained by way of interpolation. For these purposes, dependent on the actual parameters, different interpolation algorithms can be used.

For instance, interpolation may happen between two intensity values. In the event of an assumed linear interpolation between two parameters par.min and par.max, this results in the following equation for the i-th element $CC_i^{par.\,\cdots\,X}$ of the color correction matrix or of the white balance matrix:

$$CC_i^{par.X} = CC_i^{par.min} + par.X * \frac{CC_i^{par.max} - CC_i^{par.min}}{par.\max - par.\min}$$

This equation can be expanded correspondingly for a higher order or for non-linear interpolation.

For instance, interpolation may happen between two types of illumination in a case of combined illumination. In the event of an assumed linear interpolation between an intensity of a bright field illumination $I_{BF}$ and an intensity of a dark field illumination $I_{DF}$, this results in the following equation for the i-th element $$CC_I^{I_{DF}I_{BF}}$$

of the color correction matrix or the white balance matrix:

$$CC_I^{I_{DF}I_{BF}} = a*CC_I^{I_{DF}} + CC_I^{I_{BF}},$$

with $$CC_I^{I_{DF}}$$

and $$CC_I^{I_{BF}}$$

being the i-th element of the matrix of an exclusive dark field illumination or of an exclusive bright field illumination, and a being a normalization parameter for the absolute maximum intensity of the individual lightings, for instance $a=I_{DF.max}/I_{BF.max}$.

Furthermore, a combined interpolation between intensities and types of illumination can be performed as well.

As explained above, various properties of the digital microscope can be described by way of spectra. The spectral profiles be parameterized by way of a complex spectral curve with at least two Gaussian bell curves. This reduces the required amount of data reduced and allows for an increased flexibility for the interpolation of the color correction values between the various parameter-specific solutions. In this case, the interpolation is performed for the received values obtained by way of the parameterization of the spectra.

REFERENCE LIST

01 Spectrum of a dark field illumination
02 Spectrum of a bright field illumination
03 Spectrum of an optical system and an image converter
04 Color reference values
05 —
06 Reference colors
07 Spectral properties of the optical system and of the sensor
08 Correction factors
09 Corrected colors 10 —
11 Corrected color values

The invention claimed is:

1. A method for correcting colors of a color reproduction of a digital microscope, comprising the following steps:
recording a color image of a sample that is to be examined under the microscope, wherein wavelength-dependent properties of a microscope illumination unit illuminating the sample are determined for describing a first state of the microscope illumination unit by capturing settings selected on the microscope illumination unit;
determining a set of correction values associated with a second state of the microscope illumination unit, wherein the second state of the microscope illumination unit associated with the set of correction values that is to be determined is selected based on the determined first state of the microscope illumination unit;
correcting the colors of the recorded color image by way of the correction values of the previously determined set of correction values; and
determining, when recording the color image of the sample that is to be examined under the microscope, wavelength-dependent properties of an optical recording device of the microscope comprising an optical system and an image converter, in order to describe a first state of the optical recording device by capturing of the selected settings on the optical recording device, wherein the set of correction values to be determined is further associated with a second state of the optical recording device, wherein a second state of the optical recording device associated with the set of the correction values to be determined is selected according to the determined first state of the optical recording device
at least two of the sets of correction values are selected from the plurality of sets of correction values associated with stored and different states of the microscope illumination unit, wherein
the determination of a set of correction values furthermore comprise a partial step in which the correction values of the at least two selected sets are interpolated
where the wavelength-dependent properties of the microscope illumination unit are described by a spectrum of the microscope illumination unit.

2. The method according to claim 1, wherein the sets of correction values associated with the stored and different states of the microscope illumination unit are determined by way of the following partial steps:
capturing the wavelength-dependent properties of the microscope illumination unit in the multiple states of the microscope illumination unit by associating the selected settings on the microscope illumination unit;
recording a color image of a color reference with the digital microscope in each of the multiple states of the microscope illumination unit; and
determining respective sets of correction values for each of the multiple states of the microscope illumination unit which describe the correction of the image recorded in the respective state of the microscope illumination unit for true-color reproduction of the color reference.

3. The method according to claim 1, wherein determining a set of correction values is accomplished by way of a calculation, taking into account the wavelength-dependent properties of the microscope illumination unit illuminating the sample.

4. The method according to claim 1 wherein the settings selected on the microscope illumination unit are captured due to the spectral measurement of the illumination light emitted by the microscope illumination unit by means of a wavelength-sensitive sensor.

5. A digital microscope, comprising an optical recording device, a microscope illumination unit, and an image processing unit configured for the execution of the method according to claim 1.

6. The method according to claim 1, wherein the settings selected on the microscope illumination unit are captured due to the spectral measurement of the illumination light emitted by the microscope illumination unit by means of a wavelength-sensitive sensor.

7. The method according to claim 2, wherein the settings selected on the microscope illumination unit are captured due to the spectral measurement of the illumination light emitted by the microscope illumination unit by means of a wavelength-sensitive sensor.

8. The method according to claim 3, wherein the settings selected on the microscope illumination unit are captured due to the spectral measurement of the illumination light emitted by the microscope illumination unit by means of a wavelength-sensitive sensor.

* * * * *